US 8,060,055 B2

(12) United States Patent
Huang

(10) Patent No.: US 8,060,055 B2
(45) Date of Patent: Nov. 15, 2011

(54) METHOD, SYSTEM AND COLOR RING BACK TONE PLATFORM FOR DOWNLOADING MEDIA RESOURCES TO TERMINAL

(75) Inventor: Chonghui Huang, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 849 days.

(21) Appl. No.: 11/916,836

(22) PCT Filed: Dec. 13, 2006

(86) PCT No.: PCT/CN2006/003400
§ 371 (c)(1),
(2), (4) Date: Dec. 7, 2007

(87) PCT Pub. No.: WO2007/082449
PCT Pub. Date: Jul. 26, 2007

(65) Prior Publication Data
US 2008/0212749 A1 Sep. 4, 2008

(30) Foreign Application Priority Data
Jan. 17, 2006 (CN) .......................... 2006 1 0033142

(51) Int. Cl.
H04M 9/00 (2006.01)
(52) U.S. Cl. ....... 455/401; 379/88.24; 379/70; 379/67.1
(58) Field of Classification Search .................... 455/401
See application file for complete search history.

(56) References Cited

U.S. PATENT DOCUMENTS 6,044,133 A * 3/2000 Furukawa et al. ......... 379/88.01
2004/0120494 A1 6/2004 Jiang et al.

FOREIGN PATENT DOCUMENTS

| CN | 1520213 | 8/2004 |
| CN | 1553720 A | 12/2004 |
| CN | 1700713 | 11/2005 |
| CN | 1731802 | 2/2006 |

(Continued)

OTHER PUBLICATIONS

European Search Report dated Sep. 10, 2008; Application No./Patent No. 06828318.3-2414 / 1976252 PCT/CN2006003400.

(Continued)

Primary Examiner — Charles Appiah
Assistant Examiner — Natasha Cosme
(74) Attorney, Agent, or Firm — Ladas & Parry LLP

(57) ABSTRACT

The present invention discloses a method for downloading media resources to a terminal. The method may be applied to mobile communication network, and includes: calling by a calling terminal a called subscriber through an MSC at a calling side; establishing a bi-direction connection between the calling terminal and a color ring back tone platform through the MSC at the calling side according to ring back tone registration information of a called terminal obtained by the MSC at the calling side; and receiving by the color ring back tone platform the download command from the calling terminal through the bi-direction connection and sending a media resource corresponding to a ring back tone to the calling terminal. The present invention also discloses a system and a color ring back tone platform for downloading media resources to a terminal. With the present invention, the subscriber may download media resources easily and conveniently.

13 Claims, 6 Drawing Sheets

FOREIGN PATENT DOCUMENTS

| | | | |
|---|---|---|---|
| EP | 1 081 928 A2 | | 3/2001 |
| EP | 1 494 442 A2 | | 1/2005 |
| WO | 2006/057504 | * | 1/2006 |
| WO | 2007/076885 A1 | | 7/2007 |

OTHER PUBLICATIONS

English Translation of Written Opinion of the International Search Authority for PCT/CN2006/003400.

Rejection Decision of Chinese Appln. No. 200710001225.9 issued Mar. 6, 2009.

First Chinese Office Action of Chinese Appln. No. 200710001225.9 issued, Dec. 4, 2009.

Second Chinese Office Action of Chinese Appln. No. 200710001225.9 issued, Apr. 2, 2011.

Second Office Action of Chinese Appln. No. 200680012819.3 issued Apr. 2, 2011.

First Office Action of Chinese Appln. No. 200680012819.3 issued Dec. 4, 2009.

* cited by examiner

METHOD, SYSTEM AND COLOR RING BACK TONE PLATFORM FOR DOWNLOADING MEDIA RESOURCES TO TERMINAL

This application claims priority to China Patent Application No. 200610033142.3, filed on Jan. 17, 2006 and entitled "System and Method for Downloading Contents Related to Ring Back Tone of Called Subscriber by Calling Subscriber", content of which is incorporated herein by reference in its entirety.

FIELD OF THE INVENTION

The present invention relates to mobile communication field, and more particularly, to a method, a system and a color ring back tone (CRBT) platform for downloading media resources to a terminal.

BACKGROUND OF THE INVENTION

Media resources include music, video, pictures and the like. Taking music as an example, the music in a terminal is typically a ring tone of a mobile phone. The ring tone of the mobile phone is a cue tone stored in the mobile phone for prompting an incoming call to the mobile phone. When there is an incoming call, the mobile phone plays the ring tone to prompt the incoming call. Ring tones of mobile phones usually may be classified into mono ring tones and chord ring tones, depending on the type of the mobile-phones and the support by the mobile phones. A mono ring tone is a fragment of monotone melody, i.e., a fragment of melody composed of musical notes such as "1, 2, 3, . . . ". Mobile phones in the early stage only support monotone music as a ring tone. A chord ring tone is a fragment of melody composed of complex rhythms and has a corresponding file format. Different brand names or models of mobile phones usually support different file formats. Presently, most mobile phones prevailing in the market support chord ring tones. A certain amount of music fragments in certain types are usually stored in a mobile phone when the mobile phone is shipped from the factory, so that the user may choose one from the music fragments as his ring tone. In addition, the user may download other music fragments and use any of the music fragments as his ring tone as required.

In the prior art, a system for downloading a ring tone to a terminal is shown in FIG. 1.

That system includes a subscriber using the ring tone downloading service, the Internet, a server of the ring tone downloading service provider (hereafter referred to as "ring tone download server"), a Wireless Application Protocol (WAP) gateway, a Push Proxy Gateway (PPG), a General Packet Radio Service (GPRS) network and a WAP terminal (a terminal supporting WAP applications or other devices).

The ring tone download server is a Web Server connected to the WAP gateway and the PPQ to provide a WAP information sending capability including WAP short message pushing and ring tone content sending, etc. The WAP gateway is connected to the ring tone download server via WAP protocol and is connected to the WAP terminal through the GPRS network, to provide a content sending channel. The PPG is connected to the GPRS network and is configured to actively push information. In other words, the PPG receives a WAP information push request from the ring tone download server and sends the WAP information to the WAP terminal. The WAP terminal is a mobile phone terminal supporting WAP. The WAP gateway is connected to the ring tone download server via Hyper Text Transfer Protocol (HTTP), and is connected to the GPRS network via WAP protocol. The ring tone download server is connected to the PPG via Push Access Protocol (PAP). The PPG is connected to the GPRS network via Push Over-The-Air (P-OTA) protocol.

The method used in the system for downloading a ring tone to a terminal includes that the subscriber chooses the ring tone at the website, and then downloads the ring tone to the terminal by means of a short message or through the over-the-air network. A chord ring tone may only be downloaded through the over-the-air network. The over-the-air network is an over-the-air transmission network established in the mobile network to provide data services, such as a General Packet Radio Service (GPRS) network. To download a chord ring tone to the terminal, the terminal user has to choose the required ring tone content and the brand name and model of the terminal on the website. Then, the website sends the specified content to the specified terminal through the GPRS network according to the specified Subscriber Identity Module (SIM) card ID.

A flow chart of the method for downloading music to a terminal by the system is shown in FIG. 2. The method includes the following processes.

In process 201, the subscriber using the ring tone downloading service accesses the ring tone download server through the Internet.

In process 202, the subscriber chooses the brand name and model of the terminal and a ring tone on the user interface provided by the ring tone download server.

In process 203, the ring tone download server creates information content to be sent to the subscriber according to the subscriber's choice in process 202.

In process 204, the ring tone download server submits the message created in process 203 to the PPG.

In process 205, the PPG pushes the message received in process 204 to the WAP terminal through the GPRS network.

In process 206, after the WAP terminal receives the message pushed from the PPQ if the subscriber chooses to use the proposed service, the WAP terminal initiates a connection request to the WAP gateway through the GPRS network and sends a ring tone file download request to the WAP gateway.

In process 207, the WAP gateway sends the ring tone file download request initiated by the subscriber to the ring tone download server.

In process 208, the ring tone download server sends the ring tone file to be downloaded to the WAP gateway.

In process 209, the WAP gateway sends the ring tone file to the WAP terminal through the GPRS network.

In process 210, after confirming the sending result, the WAP gateway returns the current download result to the ring tone download server.

The ring tone download server then may choose to resend (if the sending has failed) or charge (if the sending is successful) according to the result returned from the WAP gateway.

SUMMARY OF THE INVENTION

The embodiments of the present invention provide a method, a system and a color ring back tone (CRBT) platform for downloading media resources to a terminal, so that a subscriber may download the media resources related to a ring back tone he is listening to.

The method, system and color ring back tone platform for downloading media resources to a terminal provided by the embodiments of the present invention are implemented as follows.

A method for downloading media resources to a terminal includes:

calling, by a calling terminal, a called subscriber who has subscribed to a color ring back tone service, through a mobile switching center at a calling side, and establishing, by the calling terminal, a bi-direction connection to a color ring back tone platform through the mobile switching center according to ring back tone registration information of a the called subscriber obtained by the mobile switching center;

sending, by the calling terminal, to the color ring back tone platform a download command for downloading a ring back tone being played by the color ring back tone platform; and receiving, by the color ring back tone platform, the download command from the calling terminal through the bi-direction connection and sending a media resource corresponding to the ring back tone to the calling terminal.

A system for downloading music to a terminal includes a mobile switching center at a calling side, a color ring back tone platform and a mobile switching center at a called side;

the mobile switching center at the calling side is configured to forward a call request sent from a calling terminal to the mobile switching center at the called side;

the color ring back tone platform is configured to play a ring back tone registered by a called subscriber to the calling terminal;

the mobile switching center at the calling side is further configured to establish a bi-direction connection to the color ring back tone platform according to obtained ring back tone registration information of a called terminal; the color ring back tone platform is further configured to receive a ring back tone download command from the calling terminal and send a media resource corresponding to the ring back tone to the calling terminal.

A color ring back tone platform for downloading media resources includes a ring back tone playing unit, a bi-direction connection establishing unit, a download command receiving unit and a media resource sending unit;

the bi-direction connection establishing unit is configured to establish a bi-direction connection to a mobile switching center at a calling side;

the ring back tone playing unit is configured to play a ring back tone registered by a called subscriber to a calling terminal through the established bi-direction connection;

the download command receiving unit is configured to receive a download command from the calling terminal through the established bi-direction connection;

the media resource sending unit is configured to send a media resource requested by the download command to the calling terminal.

It may be seen from the above technical solutions provided by the embodiments of the present invention that, in the embodiments of the present invention, the calling terminal establishes a bi-direction connection with the color ring back tone platform during calling the called terminal that has subscribed to the color ring back tone service. Therefore, the color ring back tone platform may receive the command for downloading the content related to the ring back tone from the calling terminal, and then send the media resource related to the ring back tone to the calling terminal. With the method provided in the embodiments of the present invention, the subscriber may download music without accessing the network. In addition, the procedures for identifying terminal model and searching for music information may be omitted for the subscriber. As a result, the subscriber may download music easily and conveniently.

DETAILED DESCRIPTION OF THE EMBODIMENTS

Figure 1:
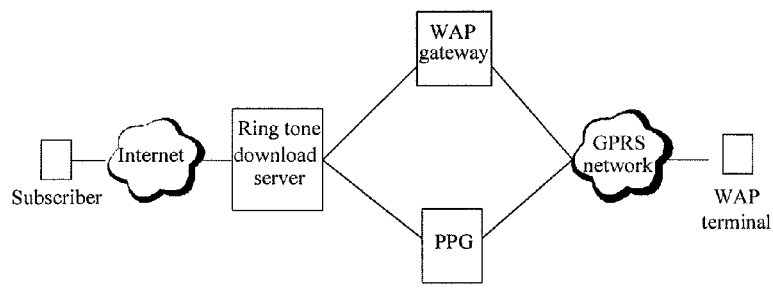
FIG. 1 is a block diagram of a system for downloading music to a terminal in the prior art.
Figure 2:
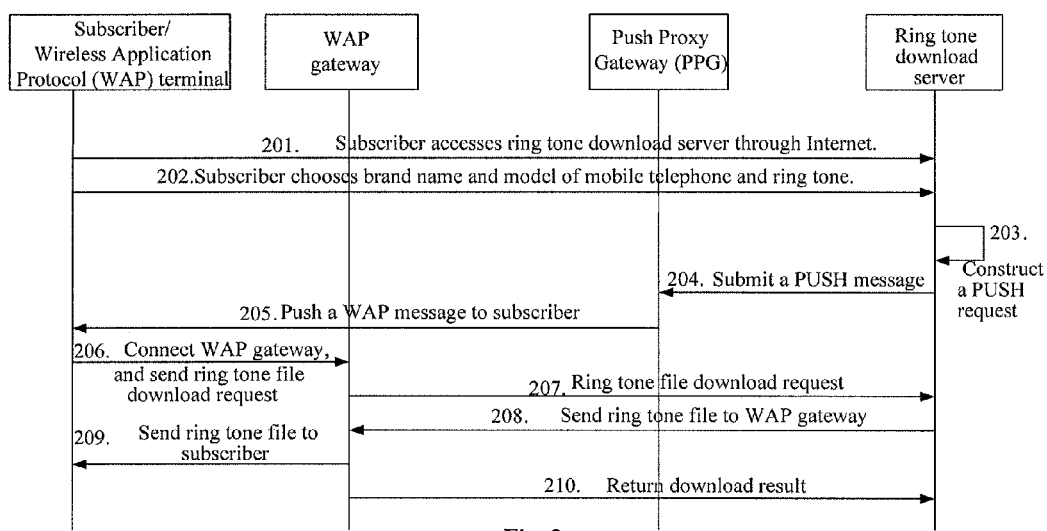
FIG. 2 is a flow chart of a method for downloading music to terminal in the prior art.

The embodiments of the present invention utilize a ring back tones registered by subscribers stored on a color ring back tone platform in the existing network. When a calling subscriber calls a called subscriber who has subscribed to the color ring back tone service, the calling terminal establishes a bi-direction connection with the color ring back tone platform. The calling subscriber sends a command for downloading the content related to a ring back tone to the color ring back tone platform during listening to the ring back tone. The color ring back tone platform sends the corresponding media resource to the calling terminal according to the received command. In a specific implementation, the calling subscriber establishes a bi-direction connection with the color ring back tone platform when calling the called subscriber who has subscribed to the color ring back tone service, and sends a command for downloading the content related to the ring back tone to the color ring back tone platform when listening to the ring back tone; the color ring back tone platform receives the command, determines the type of the calling terminal and the content of the ring back tone, and then sends a content confirming message to the WAP terminal of the calling subscriber; the WAP terminal confirms the received message and then establishes a connection with the WAP gateway, and initiates a content download request to the color ring back tone platform; the color ring back tone platform then sends the ring back tone or the media resource related to the ring back tone to the WAP terminal of the calling subscriber through the WAP gateway.

In the described prior art, the subscriber has to access the website firstly to choose the music fragment to be downloaded as the ring tone. However, that approach is difficult to be popularized due to the inconvenience in connecting to the network for some subscribers. Therefore, that approach hinders the popularization of ring tone downloading. Additionally, the subscriber has to choose the brand name and model of the terminal. For a subscriber who doesn't know the terminal model, the downloading may fail or the downloaded ring tone may not be used if the subscriber chooses a wrong model. Furthermore, it is very inconvenient for the subscriber to search for a desired ring tone from the vast information available at the website.

Some embodiments of the present invention will be described hereunder. The present invention will be further described in detail with reference to the embodiments in conjunction with the accompanying drawings, in order to make the technical solutions of the embodiments of the present invention understood better by those skilled in the art.

Those skilled in the art know that in an existing mobile communication network, by introducing a Color Ring Back Tone (CRBT) platform, a calling terminal may hear a segment of music as a ring back tone when it calls a called terminal. This function may be implemented because the called subscriber in the system has subscribed to the color ring back tone service and the played ring back tone is a media resource stored in the color ring back tone platform. In view of this, the present invention utilizes the color ring back tone platform in conjunction with the existing mobile communication network to download the media resource related to the ring back tone heard by the calling subscriber to the terminal of the calling subscriber.

The multimedia color ring back tones include music, video, pictures and the like. Hereunder the embodiments of the present invention will be described by taking a music multimedia color ring back tone (specifically a ring back tone) as an example.

Figure 3:
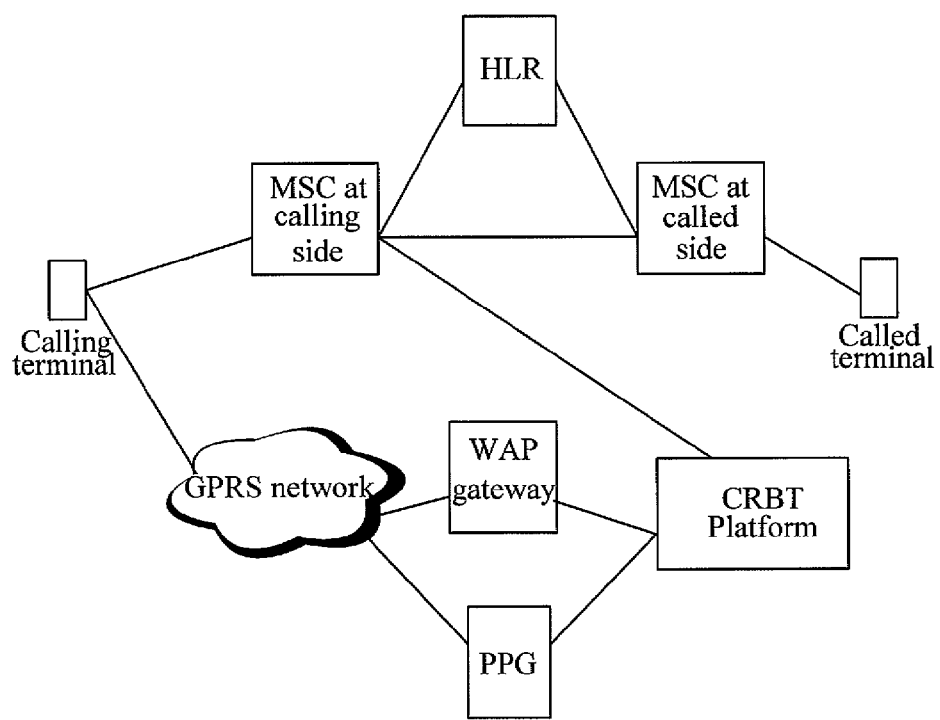
FIG. 3 is a block diagram of a system according to an embodiment of the present invention.

FIG. 3 shows a block diagram of a system according to an embodiment of the present invention.

As shown in FIG. 3, the system includes the following units.

A Mobile Switching Center (MSC) at a calling side, a Home Location Register (HLR), a Mobile Switching Center (MSC) at a called side, a Push Proxy Gateway (PPG), a Wireless Application Protocol (WAP) gateway, a Color Ring Back Tone (CRBT) platform and WAP terminals.

The respective purposes of the units are described hereunder.

The MSC at the calling side is configured to handle a call request initiated by the calling terminal and establish a bi-direction connection with the color ring back tone platform.

The MSC at the called side is configured to return a roaming number of the called terminal to the HLR upon receipt of a request for the roaming number of the called terminal from the HLR, and send a call request to the called terminal.

The HLR is configured to store roaming numbers and ring back tone registration information of its subordinate user terminals and provide the roaming number of the called terminal to the MSC at the calling side upon receipt of a call request from the MSC at the calling side such that the MSC at the calling side may call the MSC at the called side. In addition, the HLR returns the ring back tone subscription information of the called terminal to the MSC at the calling side.

The CRBT platform is configured to play the ring back tone registered by the called subscriber to the calling terminal, determine the information related to the content to be downloaded upon receipt of a download command sent by the calling terminal through the bi-direction connection established between the MSC at the calling side and the CRBT platform, send the information related to the content to be downloaded to the calling terminal through the PPQ and then establish a connection with the calling terminal and send the ring back tone content to the calling terminal through the WAP gateway upon receipt of the confirmation from the calling terminal.

The PPG is configured to push the download content confirming message to the calling terminal.

The WAP gateway is configured to provide a content sending channel. In the course of providing the content sending channel, the WAP gateway receives the content download request sent by the calling terminal in the form of a WAP message. The WAP message carries terminal type information of the calling subscriber, so that the color ring back tone platform may obtain the type information of the calling terminal.

The system further includes a calling subscriber and a called subscriber. The calling subscribe is an initiator of a voice call, and is a downloader and user of the ring back tone content in the present invention. Only when the terminal used by the calling subscriber is a WAP terminal can it receive WAP information, initiate a WAP download operation and receive content information.

A called subscriber is a receiver of the voice call, and must be a subscriber who has subscribed to the color ring back tone service in the present invention. What is downloaded by the calling subscriber is the content related to a ring back tone registered by the called subscriber and matches the WAP terminal of the calling subscriber.

The protocols applicable to the connections between the respective devices will be introduced hereunder. The WAP gateway is connected to the color ring back tone platform via HTTP protocol. The WAP gateway is connected to the GPRS network via WAP protocol. The color ring back tone platform is connected to the PPG via PAP protocol. The PPG is connected to the GPRS network via P-OTA protocol. The MSC at the calling side is connected to the MSC at the called side via Telephone User Part/ISDN User Part (TUP/ISUP) protocol. The MSC at the calling side and the MSC at the called side are connected to the HLR via Mobile Application Part (MAP) protocol, respectively.

The procedure for attaining the object of the present invention by the above system is similar to those of the method described below. The method provided in the present invention is introduced in detail.

Figure 4:
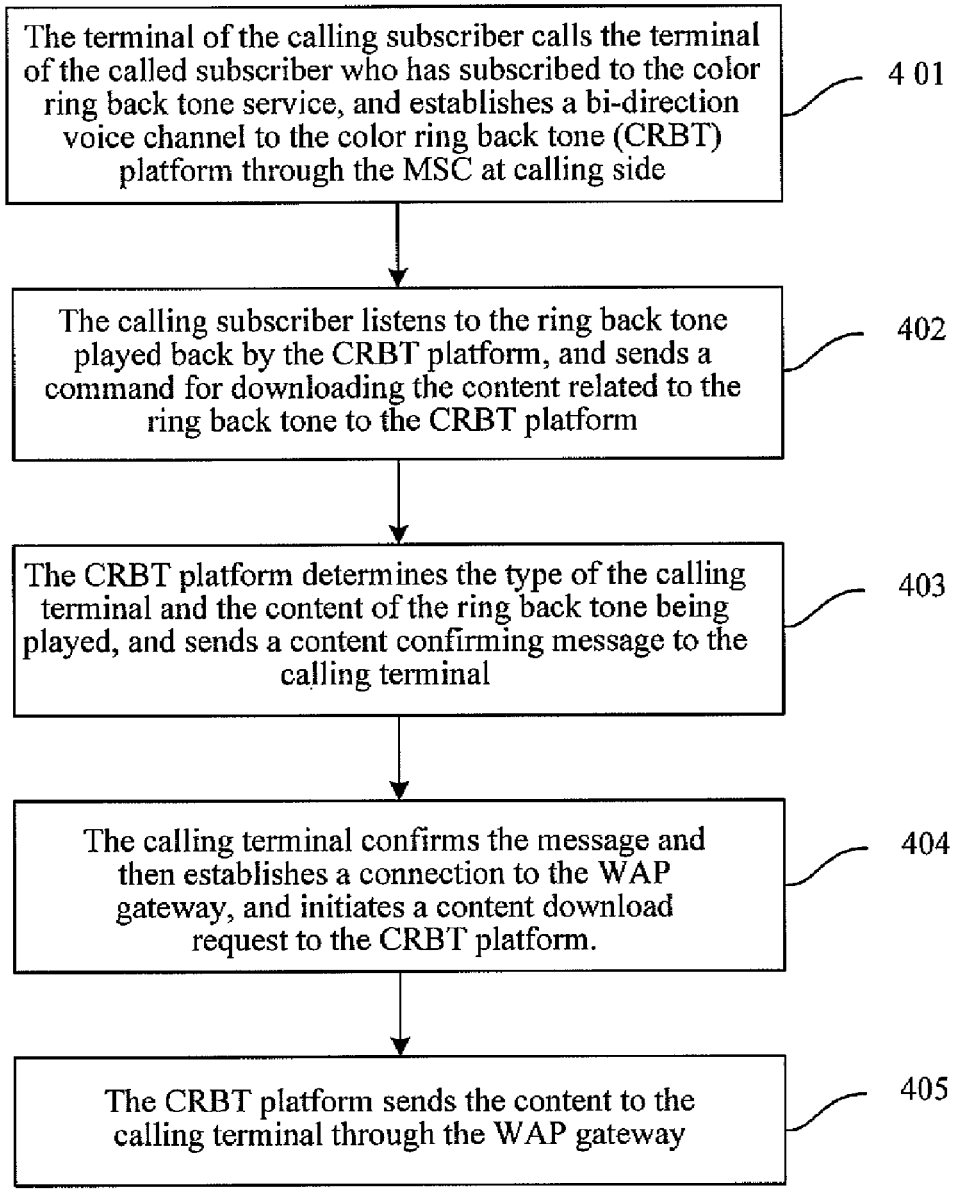
FIG. 4 is a flow chart of a method according to an embodiment of the present invention.

FIG. 4 shows a flow chart of the method according to an embodiment of the present invention.

In process 401, the calling subscriber establishes a bi-direction connection with the color ring back tone platform through the mobile switching center at the calling side in the course of calling the called subscriber who has subscribed to the color ring back tone service.

An implementation of the process is as follows.

The calling terminal initiates a call request to the called terminal. The called subscriber has subscribed to the color ring back tone service. In executing this process, the calling terminal initiates a call request to the MSC at the calling side firstly. The MSC at the calling side queries the HLR to which the called terminal is subordinate and sends a connection setup request to the MSC at the called side, and the MSC at the calling side obtains ring back tone registration information of the called terminal. The MSC at the calling side establishes a bi-direction connection with the CRBT platform according to the obtained information. In this way, a bi-direction connection is established between the calling terminal and the CRBT platform.

In process 402, the calling subscriber listens to the ring-back tone played by the color ring back tone platform, and sends to the color ring back tone platform a command of downloading the content related to the ring back tone.

In this process, the calling subscriber may send the ringback tone download command by key pressing. For example, the key "#" on the keypad of the mobile phone may be set as a download command key. Once this key is pressed down, an audio frequency signal will be generated and sent to the CRBT platform through the switching network. Of course, any other key or a combination of keys may be set as the download command key, or a new key may be added to serve as the download command key. In addition, other approaches may also be used, as long as the calling subscriber may send the ring-back tone download command.

If the ring back tone download command is an audio frequency signal, for an instance, the calling subscriber may preset a key on the keypad as the ring back tone download command key; once the key is pressed down, a Dual Tone Multi-Frequency (DTMF) signal is generated and sent to the color ring back tone platform.

In process 403, the color ring back tone platform determines the information (e.g., brand name and model) of the WAP terminal of the calling subscriber and the content of the ring back tone currently played, and sends a content confirming message to the calling terminal.

In this process, the CRBT platform has enable a number receiving function. In addition, since a bi-direction connection between the calling terminal and the CRBT platform has been established in process 401. Therefore, with the number receiving function, the CRBT platform may obtain the ring back tone download command from the calling subscriber once the preset key is pressed. For example, the CRBT platform receives the audio frequency signal with the number receiving function, and compares the received key information with the preset key information. If the two kinds of information are identical, the CRBT platform starts the process for downloading the content related to the ring back tone, in other words, the CRBT platform sends a content confirming message to the calling terminal. If the two kinds of information are not identical, the CRBT platform continues the original work.

The CRBT platform determines that the terminal requests for downloading a ring back tone, searches the historical information in the system to obtain the type (i.e., brand name and model, etc.) of the calling terminal, and determines a content list of music which has the same name or coding as the desired ring back tone and is in a format matching the type of the calling terminal. The CRBT platform then sends the content confirming message containing the above content to the calling terminal.

Above historical information is stored in a termination information database of the CRBT system. The termination information database may be established in any of the following three ways.

(1) The termination information database is set by the terminal user.

The CRBT platform provides a user interface. The terminal user chooses a mapping relation of the brand name and model of the terminal with the Subscriber Identity Module (SIM) card ID. The CRBT platform stores the mapping relation and constructs the terminal information database.

(2) The CRBT platform collects terminal information and establishes the terminal information database.

The CRBT platform collects existing information databases from Service Providers (SPs) or operators by cooperating with the SPs or the operators, so as to enrich its own terminal information database.

(3) The CRBT platform collects the terminal information by means of WAP and establishes the terminal information database.

When subscribers access the WAP gateway, the brand name and model of some terminals may be obtained by the WAP gateway. In this way, the CRBT platform obtains the brand name and model of a subscriber's terminal when the terminal accesses a provided WAP webpage and uses the information directly, and constructs a terminal information database.

In process 404, the calling terminal confirms the received message and then establishes a connection with the WAP gateway, and initiates a content download request to the color ring back tone platform.

In process 405, the color ring back tone platform sends the content to the calling terminal through the WAP gateway.

It may be seen from the above processes that, when the terminal of the calling subscriber calls the terminal of the called subscriber who has subscribed to the color ring back tone service, the calling subscriber may download the content related to the ring back tone directly without accessing the network. In addition, the subscriber needn't to determine the terminal model. Therefore, the subscriber may download music conveniently and easily.

Though the described flow chart of the method illustrates the case that the calling terminal downloads music through a GPRS network, those skilled in the art would appreciated that when the method provided in the present invention is applied to a CDMA network, the terminal of the calling subscriber may download music via the CDMA network through similar processes, which thus will not be described further here.

A signaling flow according to an embodiment will be described hereunder, in which signaling flow the calling terminal establishes a connection to the CRBT platform through the MSC at the calling side so as to listen to the ring back tone played by the CRBT platform.

Figure 5:
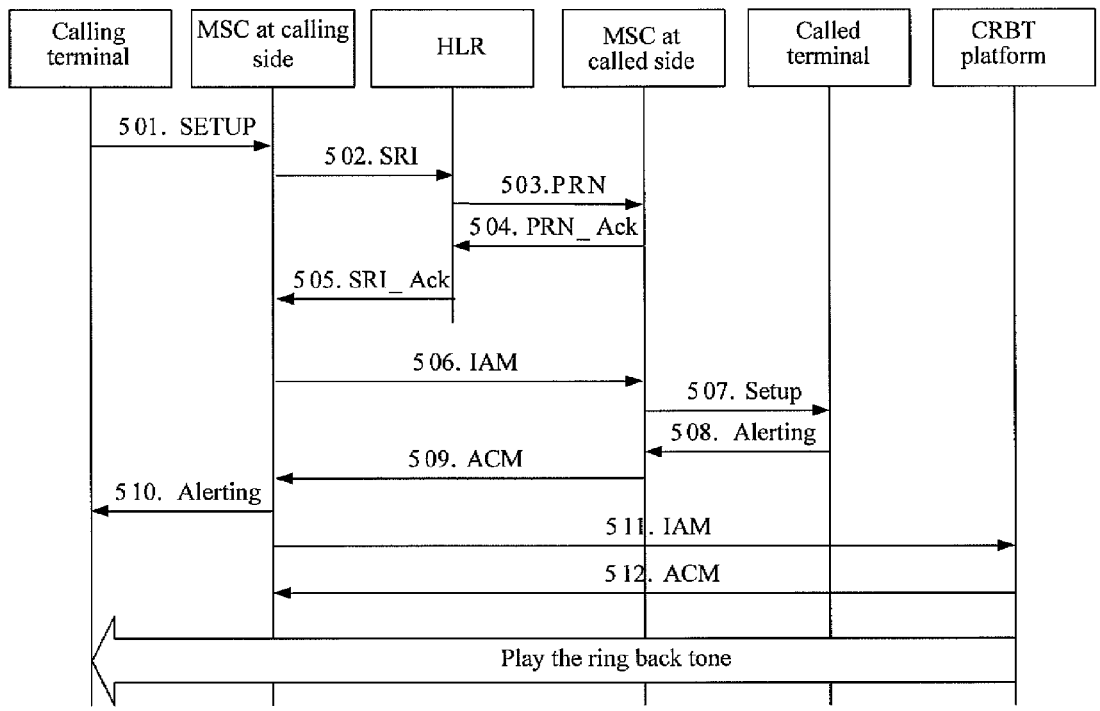
FIG. 5 is a signaling flow chart of connection setup between a calling terminal and a CRBT platform according to an embodiment of the present invention.

FIG. 5 shows the signaling flow.

In process 501, the calling terminal sends a SETUP to the MSC at the calling side. The message is a connection setup request initiated by the calling terminal to the called terminal.

In process 502, the MSC at the calling side sends a MAP_SEND_ROUTING_INFORMATION (SRI) to the HLR to which the called terminal is subordinate. The signaling is used by the MSC at the calling side to query the HLR for information (e.g., roaming number) of the called terminal.

In process 503, the HLR sends a MAP_PROVIDE_ROAMING_NUMBER (PRN) to the MSC at the called side. The signaling is used by the HLR to query the MSC at the called side for the information (e.g., roaming number) of the called terminal.

In process 504, the MSC at the called side returns a PRN_Ack to the HLR. The message carries the information (e.g., roaming number) of the called terminal. The message responds to the query request in process 503, in other words, is used by the MSC at the called side to return the information related to the called terminal to the HLR.

In process 505, the HLR returns an SRI_Ack to the MSC at the calling side. The message carries the roaming number of the called terminal returned from the MSC at the called side in process 504 and the ring back tone registration information (SS_Code) of the called terminal stored in the HLR.

In process 506, the MSC at the calling side sends an Initial address message (IAM) to the MSC at the called side. With the signaling, the MSC at the calling side uses the roaming number to initiate a call to the called terminal, and records the SS_Code in the SRI_Ack, to verify whether the called subscriber has subscribed to the color ring back tone service.

In process 507, the MSC at the called side sends a Setup to the called terminal. This signaling is used by the MSC at the called side to initiate a call to the called terminal.

In process 508, the called terminal returns an Alerting to the MSC at the called side. This signaling is used by the called terminal to return a ringing signal to the MSC at the called side.

In process 509, the MSC at the called side sends an Acknowledged Message (ACM) to the MSC at the calling side. This signaling is used by the MSC at the called side to return a call confirmation signal to the MSC at the calling side.

In process 510, the MSC at the calling side sends an Alerting to the calling terminal. The signaling is used by the MSC at the calling side to send the ringing signal to the calling terminal.

In process 511, the MSC at the calling side sends an Initial Address Message (IAM) to the CRBT platform. The signaling is used by the MSC at the calling side to initiate a call to the CRBT platform after the MSC at the calling side verifies the ring back tone registration information of the called terminal sent in process 509.

The IAM contains the calling number, the called number, etc. The color ring back tone platform may play the predetermined ring back tone to the calling terminal according to the content in the IAM message.

In process 512, the color ring back tone platform sends an Acknowledged Message (ACM) to the MSC at the calling side. This signaling is used by the CRBT platform to return a confirmation signal to the MSC at the calling side.

After the above signaling flow, the MSC at the calling side establishes a bi-direction connection with the CRBT platform, and thus realizes a bi-direction connection between the color ring back tone platform and the calling terminal, such that the CRBT platform may prepare to receive the command from the calling terminal while the ring back tone registered by the called subscriber is played to the calling terminal. In the prior art, the MSC only establishes a mono-direction connection to the color ring back tone platform after receiving the ACM message, so that the CRBT platform may play the ring back tone to the calling terminal through the MSC at the calling side. In the present invention, the MSC is further provided with a function, that is, the MSC establishes a bi-direction connection with the CRBT platform after receiving the ACM message, so that the color ring back tone platform may receive a command from the calling terminal.

The calling subscriber then may decide whether to download the ring back tone when waiting for being connected to the called subscriber and listening to the ring back tone; the calling terminal may send the ring back tone download command by means of key pressing; then the color ring back tone platform determines the type of the WAP terminal and verifies the ring back tone download command; this procedure is the above processes 402-405. The color ring back tone platform then sends the music content corresponding to the requested ring back tone to the calling terminal.

Figure 6:
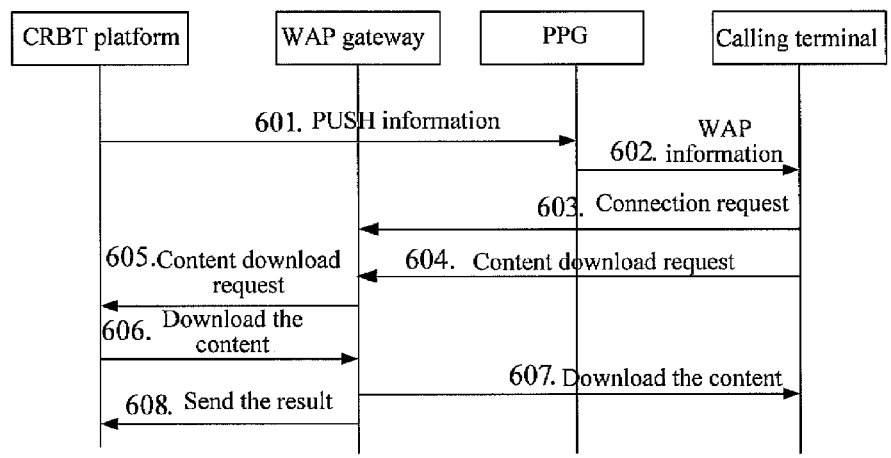
FIG. 6 is a signaling flow chart of a ring back tone downloading process according to an embodiment of the present invention.

An embodiment that implements the signaling flow of ring back tone downloading is shown in FIG. 6.

In process 601, the CRBT platform sends a PUSH message containing the content confirming information to the PPG with the signaling. The content confirming information usually includes proposed language and proposed content, etc.

In process 602, the PPG sends WAP information to the calling terminal. The signaling is used by the PPG to send the PUSH message from the CRBT platform to the WAP terminal of the calling subscriber via the air interface of the GPRS network.

In process 603, the calling terminal sends a connection request to the WAP gateway. The signaling is used by the calling terminal to request for establishing a connection to the WAP gateway so as to download the music after confirming the content confirming information.

In process 604, the calling terminal sends a content download request to the WAP gateway.

In process 605, the WAP gateway initiates a content download request to the CRBT platform.

In process 606, the CRBT platform sends the content to be downloaded to the WAP gateway.

In process 607, the WAP gateway sends the content to the WAP terminal of the calling subscriber through an air channel of the GPRS network.

In process 608, the WAP gateway returns the download result to the CRBT platform.

The CRBT platform then may carry out subsequent operations according to the result returned from the WAP gateway. For example, the CRBT platform sends the content again if the content sending fails, and notifies the charging if the content sending is successful.

Figure 7:
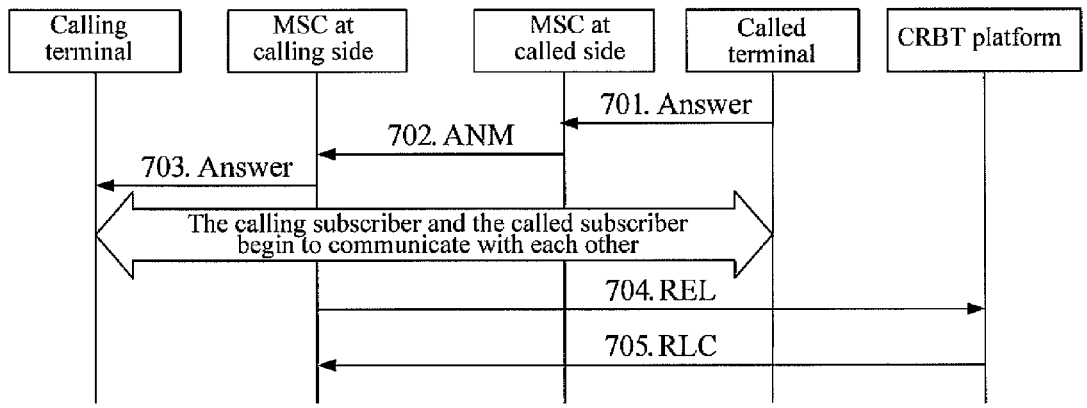
FIG. 7 is a signaling flow chart of the process that a called terminal lifts off the hook and answers according to an embodiment of the present invention.

Then the called subscriber lifts off the hook and answers the call, and the calling terminal disconnects from the CRBT platform. An embodiment of the signaling flow is shown in FIG. 7.

In process 701, the called terminal sends an Answer to the MSC at the called side. The message indicates that the called subscriber has lifted off the hook and answered.

In process 702, the MSC at the called side sends an Answer Message (ANM) to the MSC at the calling side.

In process 703, the MSC at the calling side sends an Answer to the calling terminal, in other words, the MSC at the calling side returns an answer signal to the calling terminal. Then the calling subscriber and the called subscriber begin to communicate with each other.

In process 704, the MSC at the calling side sends a Release (REL) to the CRBT platform. The signaling is a signal that indicates the MSC at the calling side initiates a release of the voice channel to the CRBT platform.

In process 705, the CRBT platform sends a Release Complete (RLC) to the MSC at the calling side. The CRBT platform disconnects the connection to the MSC at the calling side and returns a release completion signal to the MSC at the calling side.

After the above procedure, the calling subscriber is connected to the called subscriber, and the two parties begin the communication.

Figure 8:
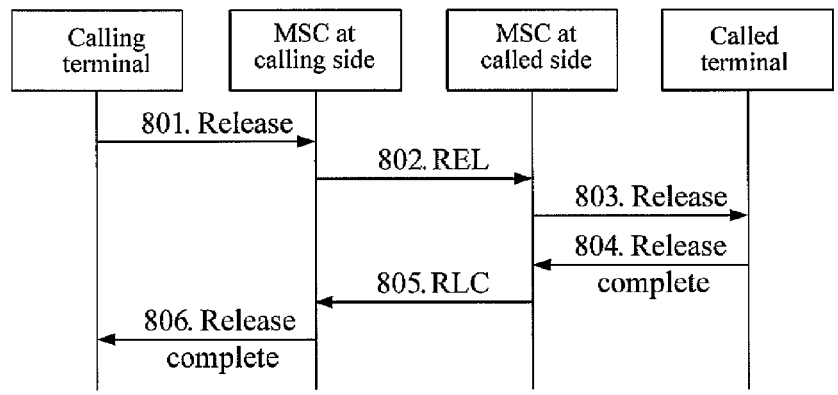
FIG. 8 is a signaling flow chart of connection release between a calling terminal and a called terminal according to an embodiment of the present invention.
Figure 9:
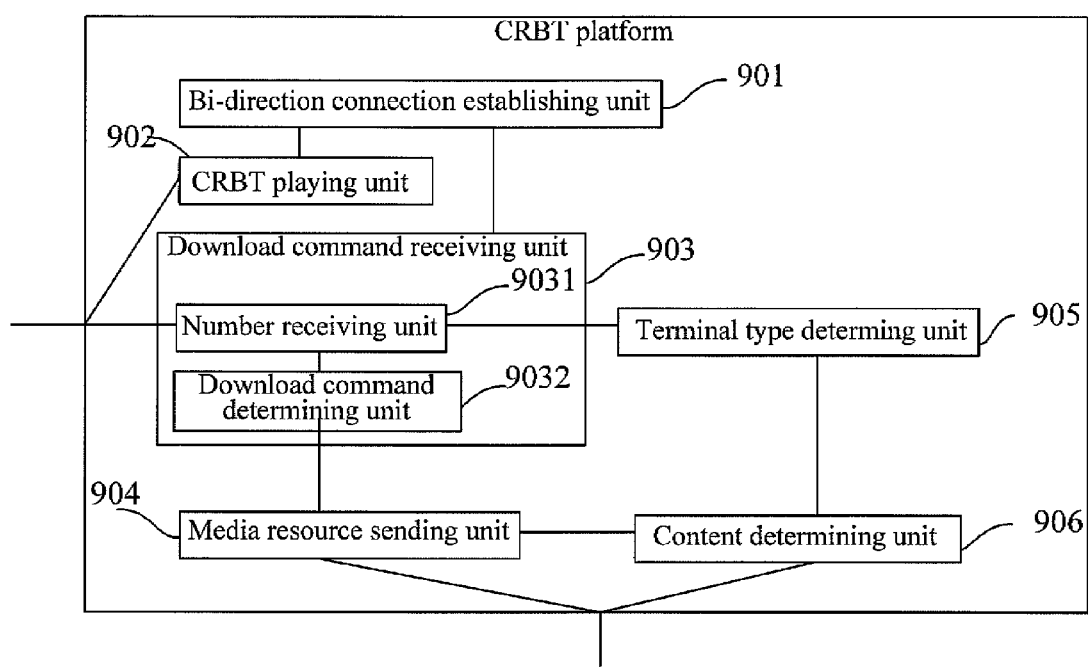
FIG. 9 is a block diagram of a color ring back tone platform according to an embodiment of the present invention.

An embodiment of the signaling flow will be introduced hereunder, in which signaling flow the calling subscriber terminates the communication. The embodiment is shown in FIG. 8.

In process 801, the calling terminal sends a Release to the MSC at the calling side. In other words, when the communication is complete, the calling subscriber hooks up, and the calling terminal initiates a call release signal.

In process 802, the MSC at the calling side sends a REL to the MSC at the called side. In other words, the MSC at the calling side sends a voice channel release message to the MSC at the called side.

In process 803, the MSC at the called side sends a Release to the called terminal. In other words, the MSC at the called side sends a call release message to the called terminal.

In process 804, the called terminal sends a Release complete to the MSC at the called side. In other words, the called terminal releases the connection to the MSC at the called side and returns a release completion signal.

In process 805, the MSC at the called side sends a RLC to the MSC at the calling side. In other words, the MSC at the called side releases the connection to the called terminal and returns a release completion signal.

In process 806, the MSC at the calling side sends a Release complete to the calling terminal. In other words, the link between the calling terminal and the called terminal is released, and the MSC at the calling side returns a release completion signal.

After the above processes, the connection between the calling terminal and the called terminal is released.

Corresponding to the above method, the present invention also provides a color ring back tone platform for downloading media resources. The color ring back tone platform includes at least a ring back tone playing unit 902, a bi-direction connection establishing unit 901, a download command receiving unit 903, and a media resource sending unit 904.

The bi-direction connection establishing unit 901 is connected to the ring back tone playing unit 902 and the download command receiving unit 903 respectively, and is configured to receive a bi-direction connection set-up request initiated by the MSC at the calling side and then establish a bi-direction connection between the download command receiving unit 903 and the ring back tone playing unit 902 with the MSC at the calling side.

The ring back tone playing unit 902 is configured to play the ring back tone registered by the called subscriber to the calling terminal.

The download command receiving unit 903 is connected to the MSC at the calling side, and is configured to receive the download command from the calling terminal through the established bi-direction connection.

The download command receiving unit 903 includes a number receiving unit 9031 and a download command determining unit 9032.

The number receiving unit 9031 is configured to receive a command from the calling terminal through the bi-direction connection;

The download command determining unit 9032 is connected to the number receiving unit 9031, and is configured to determine whether the command received from the number receiving unit is a download command.

The media resource sending unit 904 is connected to the download command receiving unit 903, and is configured to send the media resources requested by the download command to the calling terminal. Specifically, the media resources may be sent to the calling terminal through the GPRS network via the WAP gateway.

Corresponding to the process for determining the terminal type and confirming the content to be downloaded in the method provided in the present invention, the color ring back tone platform may further include a terminal type determining unit 905 and a content determining unit 906.

The terminal type determining unit 905 is connected to the number receiving unit 9031, and is configured to determine the type of the calling terminal after the download command is received.

The content determining unit 906 is connected to the terminal type determining unit 905, and is configured to match the content receivable by the terminal according to the type of the terminal, send the content confirming message to the calling terminal, and receive the confirmation of the content confirming message from the calling terminal. The content confirming message contains a content list matching the type of the calling terminal. The content determining unit 906 is also connected to the media resource sending unit 904, and is configured to instruct the media resource sending unit 904 to send the confirmed media resources to the calling terminal after the confirmation from the calling terminal is received.

It is seen from above embodiments that, since the terminal of the calling subscriber establishes a bi-direction connection with the color ring back tone platform during the calling subscriber calling the called subscriber who has subscribed to color ring back tone service, the calling subscriber may send a command to download the content related to the ring back tone. Then the color ring back tone platform determines the information of the calling subscriber's WAP terminal (e.g., brand name and model) and the content of the ring back tone, and sends the music content of the ring back tone to the calling terminal via the WAP gateway through the GPRS network. With the method provided in the embodiments of the present invention, the subscriber may download music without accessing the network. In addition, the procedures for determining terminal type and selecting media resources may be omitted for the subscriber. As a result, the subscriber may download the media resources easily and conveniently.

While the present invention has been illustrated and described with reference to some preferred embodiments, those skilled in the art will appreciate that various variations and modifications may be made without departing from the spirit and scope of the present invention as defined by the accompanying claims.

The invention claimed is:

1. A method for downloading media resources to a terminal, comprising:

configuring, by a calling terminal, a mapping relation between a type of the terminal and subscriber identify module card through a color ring back tone platform, the configured content based on the mapping relation constituting historical information in a terminal information database;

calling, by the calling terminal, a called subscriber who has subscribed to a color ring back tone service, through a Mobile Switching Center, MSC, at a calling side, and establishing, by the calling terminal, a bi-direction connection to the color ring back tone platform through the mobile switching center according to ring back tone registration information of the called subscriber obtained by the mobile switching center;

sending, by the calling terminal, to the color ring back tone platform a download command for downloading a ring back tone being played by the color ring back tone platform; and receiving, by the color ring back tone platform, the download command from the calling terminal through the bi-direction connection searching, by the color ring back tone platform, the historical information to obtain the type of the calling terminal;

determining, by the color ring back tone platform, a content list in a format matching the type of the calling terminal;

sending, by the color ring back tone platform, a content confirming message to the calling terminal and obtaining a confirmation, wherein the content confirming message containing the content list; and and sending a confirmed media resource corresponding to the ring back tone to the calling terminal after the confirmation from the calling terminal is received.

2. The method according to claim 1, wherein the processes of calling by a calling terminal a called subscriber through a mobile switching center at a calling side and establishing a bi-direction connection to a color ring back tone platform through the mobile switching center according to the obtained ring back tone registration information comprising:

initiating, by the calling terminal, a connection setup request to the mobile switching center, and initiating, by the mobile switching center, a request for querying information of the called terminal to a Home Location Register, HLR;

returning, by the home location register, a message containing the ring back tone registration information of the called terminal to the mobile switching center; and establishing, by the calling terminal, the bi-direction connection to the call ring back tone platform through the mobile switching center according to the obtained ring back tone registration information of the called terminal.

3. The method according to claim 1, wherein the process of establishing by the calling terminal a bi-direction connection to a color ring back tone platform comprises:

sending, by the mobile switching center, an initial address message to the color ring back tone platform according to the obtained ring back tone registration information of the called terminal;

returning, by the color ring back tone platform, a response message to the mobile switching center, and establishing, by the calling terminal, the bi-direction connection to the color ring back tone platform through the mobile switching center.

4. The method according to claim 1, wherein the process of sending by the calling terminal the download command to the color ring back tone platform comprises:

sending the download command to the color ring back tone platform through entering key information on the terminal by a calling subscriber.

5. The method according to claim 1, wherein the process of receiving by the color ring back tone platform the download command from the calling terminal comprises:

receiving, by the color ring back tone platform, an audio frequency signal from the calling terminal with a number receiving function and determining that the audio frequency signal is a ring back tone download command.

6. The method according to claim 1, wherein the method further comprises at least one of the following processes:

collecting, by the color ring back tone platform, information databases constructed by cooperating content providers or operators as the historical information in the terminal information database of the color ring back tone platform; and/or taking, by the color ring back tone platform, terminal type information collected through a Wireless Application Protocol, WAP, webpage when the subscriber accesses the wireless application protocol webpage with the terminal as the historical information in the terminal information database.

7. The method according to claim 1, wherein the process of sending the media resource corresponding to the ring back tone to the calling terminal by the color ring back tone platform comprises:

establishing, by the calling terminal, a connection to a wireless application protocol gateway and initiating a download request to the color ring back tone platform;

sending, by the color ring back tone platform, the requested media resource to the calling terminal through the WAP gateway.

8. A system for downloading music to a terminal, comprising a Mobile Switching Center, MSC, at a calling side, a color ring back tone platform and a mobile switching center at a called side, wherein the mobile switching center at the calling side is configured to forward a call request sent from a calling terminal to the mobile switching center at the called side;

the color ring back tone platform is configured to play a ring back tone registered by a called subscriber to the calling terminal;

the mobile switching center at the calling side is further configured to establish a bi-direction connection to the color ring back tone platform according to obtained ring back tone registration information of a called terminal;

the color ring back tone platform is further configured to receive a ring back tone download command from the calling terminal and send a media resource corresponding to the ring back tone to the calling terminal;

wherein historical information is constituted by a mapping relation between a type of the terminal and subscriber identify module card through the color ring back tone platform configured by the calling terminal, is stored in a terminal database of color ring back tone platform; and the color ring back tone platform further comprises a terminal type determining unit and a content determining unit, a media resource sending unit the terminal type determining unit is configured to determine the type of the calling terminal according to the command received by the number receiving unit from the calling terminal, and provides the type information to the content determining unit;

the content determining unit is configured to send a content confirming message to the calling terminal and receive a confirmation of the content confirming message from the calling terminal, wherein the content confirming message contains a content list matching the type of the calling terminal; the content determining unit is further configured to, instruct the media resource sending unit to send a confirmed media resource to the calling terminal after the confirmation from the calling terminal is received.

9. The system according to claim 8, wherein the color ring back tone platform comprises a ring back tone playing unit, a bi-direction connection establishing unit, a download command receiving unit and a media resource sending unit; wherein the bi-direction connection establishing unit is configured to establish the bi-direction connection with the mobile switching center at the calling side;

the ring back tone playing unit is configured to play the ring back tone registered by the called subscriber to the calling terminal through the established bi-direction connection;

the download command receiving unit is configured to receive a download command from the calling terminal through the established bi-direction connection;

the media resource sending unit is configured to send the media resource requested by the download command to the calling terminal.

10. The system according to claim 9, wherein the download command receiving unit comprises a number receiving unit and a download command determining unit, wherein the number receiving unit is configured to receive a command from the calling terminal through the bi-direction connection;

the download command determining unit is configured to determine whether the command received from the number receiving unit is a download command.

11. The system according to claim 10, wherein the command sent from the calling terminal is a command in the form of an audio frequency signal.

12. The system according to claim 8, wherein the system further comprises a WAP gateway configured to provide a content sending channel between the color ring back tone platform and the calling terminal.

13. The system according to claim 8, wherein the calling terminal is a WAP terminal.

* * * * *